(12) United States Patent
Li et al.

(10) Patent No.: US 10,931,871 B2
(45) Date of Patent: Feb. 23, 2021

(54) PIPELINE DETECTION METHOD AND APPARATUS, AND STORAGE MEDIUM

(71) Applicant: SHENZHEN UNIVERSITY, Shenzhen (CN)

(72) Inventors: Qingquan Li, Shenzhen (CN); Jiasong Zhu, Shenzhen (CN); Chisheng Wang, Shenzhen (CN); Zhipeng Chen, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

(21) Appl. No.: 16/631,527

(22) PCT Filed: Nov. 3, 2017

(86) PCT No.: PCT/CN2017/109209
§ 371 (c)(1),
(2) Date: Jan. 16, 2020

(87) PCT Pub. No.: WO2019/051961
PCT Pub. Date: Mar. 21, 2019

(65) Prior Publication Data
US 2020/0177805 A1   Jun. 4, 2020

(30) Foreign Application Priority Data

Sep. 18, 2017  (CN) .................. 201710841141.X (51) Int. Cl.
*H04N 5/232* (2006.01)
*G06T 7/246* (2017.01)
*H04N 5/225* (2006.01)

(52) U.S. Cl.
CPC ......... *H04N 5/23229* (2013.01); *G06T 7/246* (2017.01); *G06T 2207/30172* (2013.01); *H04N 2005/2255* (2013.01)

(58) Field of Classification Search
None
See application file for complete search history.

(56) References Cited

U.S. PATENT DOCUMENTS

2016/0356665 A1* 12/2016 Felemban ........... G01M 3/2807

FOREIGN PATENT DOCUMENTS

| CN | 101294917 A | 10/2008 |
|----|-------------|---------|
| CN | 103745474 A | 4/2014  |

(Continued)

OTHER PUBLICATIONS

International Search Report dated Jun. 1, 2018 in corresponding International application No. PCT/CN2017/109209; 2 pages.

*Primary Examiner* — Christopher Braniff
(74) *Attorney, Agent, or Firm* — Maier & Maier, PLLC (57) ABSTRACT

A method including: putting a pre-set detection apparatus in a pipeline to be detected, collecting, every pre-set time, movement information about and pipeline image thereof; at each collection moment, calculating, according to movement information collected, first position where detection apparatus is located; calculating, according to pipeline image photographed, second position where detection apparatus is located; determining, according to first position and second position, position where detection apparatus is located so as to position pipeline according to position at each collection moment. By performing position information extraction by means of inertial navigation and video combined positioning algorithm, accurate positioning of pipeline position is realized, so as to accurately position crack inside pipeline according to photographed image and positioned pipeline position. The pipeline detection method can be widely used for conventional exploration of a liquid pipeline, such as a city drainage pipeline and a tap water pipeline.

9 Claims, 2 Drawing Sheets

(56) References Cited

FOREIGN PATENT DOCUMENTS

| | | | |
|---|---|---|---|
| CN | 105100682 | * | 11/2015 |
| CN | 105100682 | A | 11/2015 |
| CN | 205066775 | U | 3/2016 |
| CN | 106597566 | A | 4/2017 |
| EP | 0621437 | A1 | 10/1994 |

* cited by examiner

PIPELINE DETECTION METHOD AND APPARATUS, AND STORAGE MEDIUM

CROSS-REFERENCES TO RELATED APPLICATIONS

This application is a national stage application of PCT Patent Application No. PCT/CN2017/109209, filed on 3 Nov. 2017, which claims priority to Chinese Patent Application No. 201710841141.X, filed on 18 Sep. 2017, the content of all of which is incorporated herein by reference.

FIELD

The present disclosure relates to the field of pipeline detection technology, and, more particularly, to a pipeline detection method, an apparatus, and a storage medium.

BACKGROUND

A liquid transport pipeline (including a water supply pipe, a drainage pipe, an oil delivery pipe and more), is a basic facility which has been widely applied in a modern society, and closely related to a daily life of people, having a positive effect on improving a living level of residents and promoting a regional economic development. However, following a service life increasing of the pipeline, under a long-term action of a working environment and a transportation of a plurality of raw materials, a plurality of damages including aging, cracks, corrosion and more, will inevitably occur, which may cause a plurality of potential accidents including a liquid leakage, a pipeline burst and more. Therefore, a survey and a maintenance for the pipeline must be conduct in a regular basis, and by checking a performance status thereof, a risk investigation may be achieved.

Currently, there are four methods for a pipeline detection, that is, a pipeline periscope detection, a closed-circuit television for pipeline monitoring, a pipeline sonar detection and a personnel entering for detection. The pipeline periscope detection is adopting a length-adjustable handle to place a high-definition camera and a light source into an inspection well, recording a video by a ground control, which has a detection distance of dozens of meters, and through the video or a plurality of pictures captured, an inner status including a crack, a blockage, a water leakage and more, in the pipeline is detected. The closed-circuit television for pipeline monitoring is adopting a video monitoring system, by means of a crawler carrying a camera lens, recording an internal condition of the pipeline through a wired control, to determine an internal defect of the pipeline. The pipeline sonar detection is adopting an acoustic method to detect a pipeline full of liquids, wherein an acoustic detection unit thereof moves in the pipeline carried by a crawler or driven by a manual dragging, to check the internal condition through acquiring a pipeline profile. The personnel entering for detection is sending personnel to go directly into the inspection well to perform an inspection directly.

However, there is still a plurality of defects existing in the current pipeline detection methods described above. For example, the pipeline periscope can be applied only for a single-point detection, without being able to obtain a pipeline full-line result; the closed-circuit television for pipeline monitoring is adopting a wired control, which is inconvenient in an operation, while a video data obtained lacks of an accurate position information; a pipeline sonar equipment has a high cost, and a relatively complex operation; and a method of the personnel entering for detection requires a plurality of personnel to attend, having a high labor intensity and a low efficiency, also there is a certain safety risk for a construction worker.

Therefore, the current technology needs to be improved and developed.

SUMMARY

According to the above described defects, a technical problem to be solved by the present disclosure is providing a pipeline detection method which is convenient to use and able to precisely locate a position of the pipeline.

A technical solution of the present disclosure to solve the technical problem described above is as follows:

A pipeline detection method, wherein comprising:

S1, putting a pre-set detection apparatus in a pipeline to be detected, collecting a movement information thereof and photographing a pipeline image by the detection apparatus in every pre-set time, wherein the movement information comprises an angular velocity and an acceleration;

S2, calculating a first position where the detection apparatus is located at each collection moment, according to the movement information collected at each of the collection moment;

S3, calculating a second position where the detection apparatus is located at each of the collection moment, according to the pipeline image photographed at each of the collection moment;

S4, determining a position where the detection apparatus is located at each of the collection moment, according to the first position and the second position at each of the collection moment, so as to locate the pipeline according to the position at each of the collection moment.

The pipeline detection method, wherein the detection apparatus has a gyroscope, an acceleration sensor, and a camera device configured inside.

The pipeline detection method, wherein collecting the movement information thereof and photographing the pipeline image by the detection apparatus in every of the pre-set time is specifically:

collecting the angular velocity of the detection device in every pre-set time by the gyroscope; collecting the acceleration of the detection device in every pre-set time by the acceleration sensor; and photographing the pipeline image in every pre-set time by the camera device.

The pipeline detection method, wherein calculating the first position where the detection apparatus is located at each of the collection moment, according to the movement information collected at each of the collection moment, comprising specifically:

S21, at a first collection moment, acquiring an initial position information of the detection device, wherein the initial position information comprises an initial velocity, an initial displacement, and an initial angle;

S22, calculating a position information at the first collection moment, according to a first movement information and the initial position information collected at the first collection moment;

S23, taking the position information at the first collection moment as an initial position at a second collection moment, and repeating the steps from S21 to S23 until finishing calculating all collection moments, so as to obtain the first position where the detection device is located at each of the collection moments.

The pipeline detection method, wherein calculating the second position where the detection apparatus is located at each of the collection moments, according to the pipeline image photographed at each of the collection moments, comprising specifically:

S31, for the first collection moment, obtaining an initial pipeline image photographed when the detection device is launched;

S32, calculating a repetitiveness between a first pipeline image collected at the first collection moment and the initial pipeline image, before determining the second position at the first collection moment according to the repetitiveness;

S33, taking the first pipeline image collected at the first collection moment as an initial pipeline image at the second collection moment, and repeating steps from S31 to S33 until a plurality of calculations at all collection moments are finished, to obtain the second position where the detection device is located at each of the collection moments.

The pipeline detection method, wherein determining the position where the detection apparatus is located at each of the collection moments, according to the first position and the second position at each of the collection moments, so as to locate the pipeline according to the position at each of the collection moments, comprising specifically:

S41, for each of the collection moments, determining whether the first position and the second position correspondingly are empty or not;

S42, If neither the first position nor the second position is empty, calculating a standard deviation of the first position and that of the second position respectively based on a third position pre-set according to the collection moment;

S43, adopting the standard deviation as a weighting coefficient to weight the first position and the second position, to obtain a determination of the position according to the collection moment, so as to locate the pipeline according to the position at each of the collection moments.

The pipeline detection method, wherein determining the position where the detection apparatus is located at each of the collection moments, according to the first position and the second position at each of the collection moments, so as to locate the pipeline according to the position at each of the collection moments, further comprising:

S44, if the first position or the second position is empty, taking the second position or the first position as the position corresponding to the collection moment, so as to locate the pipeline according to the position at each collection moment.

The pipeline detection method, wherein after the detection apparatus is located at each of the collection moments, according to the first position and the second position at each of the collection moments, so as to locate the pipeline according to the position at each of the collection moments, further comprising:

S5, detecting all of the pipeline images photographed, and obtaining collection moments corresponding to the pipeline images having at least one crack;

S6, obtaining the positions corresponding to the collection moment, so as to locate the crack.

A computer readable storage medium, wherein the computer readable storage medium has one or more programs stored, the one or more programs is able to be executed by one or more processors, so as to realize the steps in any one of the pipeline detection methods described above.

A detection apparatus, wherein having a gyroscope, an acceleration sensor, a camera device, a processor and a memory therein; the gyroscope, the acceleration sensor, the camera device are all connecting to the memory;

the memory has a computer readable program stored, the computer readable program is able to be executed by the processor; together with a plurality of data collected by the gyroscope, the acceleration sensor, and the camera device at each of the collection moments;

when the processor executes the computer readable program, it is able to realize the steps in any one of the pipeline detection methods described above.

Benefits: comparing to the prior art, the present disclosure provides a pipeline detection method and apparatus, and a storage medium. The method comprises: putting a pre-set detection apparatus in a pipeline to be detected, while in every pre-set time, collecting a movement information thereof and a pipeline image; calculating respectively a first position and a second position that the detection apparatus locates at each collection moment, according to the movement information and a pipeline relation collected at each collection moment; determining a position that the detection apparatus locates at each collection moment based on the first position and the second position responding to each collection moment, so as to locate the pipeline according to the position at each of the collection moments. The present disclosure uses a location algorithm of combining an inertial navigation and a video to extract a position information, realizing a precise location of a pipeline position, so as to precisely locate any cracks in the pipeline according to a plurality of images photographed and the pipeline positions located. At a same time, the pipeline detection method may be widely applied to a conventional survey in a plurality of liquid pipelines including an urban drainage pipeline and a tap water pipeline.

DETAILED DESCRIPTION OF EMBODIMENTS

The present disclosure provides a pipeline detection method and apparatus, and a storage medium, in order to make the purpose, technical solution and the advantages of the present disclosure clearer and more explicit, further detailed descriptions of the present disclosure are stated here, referencing to the attached drawings and some embodiments of the present disclosure. It should be understood that the detailed embodiments of the disclosure described here are used to explain the present disclosure only, instead of limiting the present disclosure.

Those skilled in the art will understand that, unless specifically claimed, otherwise the singular forms of "a", "an", "the" may also include a plural form. It should be further understood that, the term "comprising" used in the description of the present disclosure refers to a presence of the described features, integers, steps, operations, elements and/or components, but does not exclude the presence or addition of one or more other features, Integers, steps, operations, elements, components, and/or groups thereof. It should be understood that when an element is referred to as being "connected" or "coupled" to another element, it may be directly connected or coupled to the other element, or a plurality of intervening elements may also be present. Furthermore, "connected" or "coupled" as used herein may also include connected wirelessly or coupled wirelessly. As used herein, the term "and/or" includes all or any of the elements and all combinations of one or more of the associated listed items.

It can be understood by the skilled in the art that, unless otherwise defined, all terms (including technical and scientific terms) used herein have a same meaning as commonly understood by an ordinary skilled in the art to which this disclosure belongs. It should also be understood that terms such as those defined in a general dictionary should be understood to have meanings consistent with the meanings in the context of the prior art, and unless being specifically defined like herein, they would not be explained by an idealized or an overly formal meaning.

Further detailed descriptions of the present disclosure are stated herein, referencing to the attached drawings and some embodiments of the present disclosure.

Figure 1:
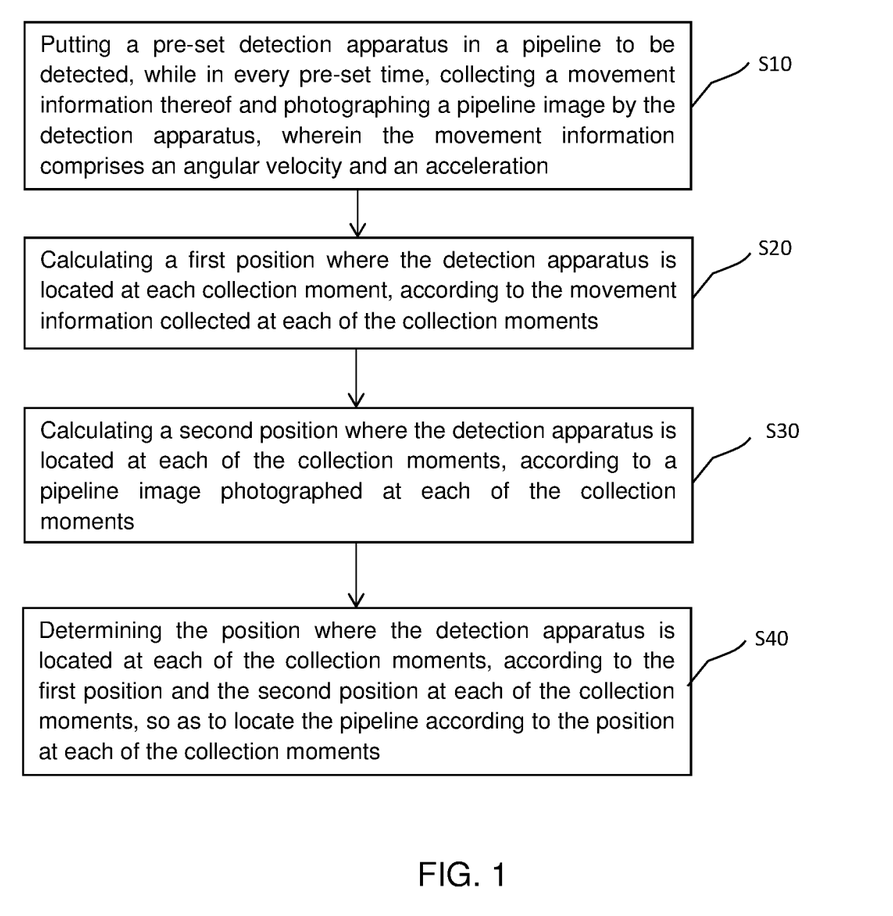
FIG. 1 illustrates a flowchart for an embodiment of the pipeline detection method provided by the present disclosure.

Referencing to FIG. 1, FIG. 1 illustrates a flowchart for an embodiment of the pipeline detection method provided by the present disclosure. The method comprises:

S10, putting a pre-set detection apparatus in a pipeline to be detected, while collecting a movement information thereof and photographing a pipeline image by the detection apparatus in every pre-set time, wherein the movement information comprises an angular velocity and an acceleration;

S20, calculating a first position where the detection apparatus is located at each of the collection moments, according to the movement information collected at each of the collection moments;

S30, calculating a second position where the detection apparatus is located at each of the collection moments, according to the pipeline image photographed at each of the collection moments;

S40, determining a position where the detection apparatus is located at each of the collection moments, according to the first position and the second position at each of the collection moments, so as to locate the pipeline according to the position at each of the collection moments.

The present embodiment provides a pipeline detection method, by putting a pre-set detection apparatus in a pipeline to be detected, and by the detection apparatus collecting a movement information thereof and a pipeline image of the pipeline to be detected in every pre-set time; calculating respectively a first position and a second position at a corresponding detection time based on the movement information and the pipeline image, determining a final position according to a collection moment based on the first position and the second position, and executing a calculation for the first position, the second position and the final position respectively at each collection moment, so as to obtain a final position according to each collection moment, further making a precise location for the pipeline. The present embodiment realizes a precise location for a pipeline position, through fusing the positions calculated by an inertial navigation positioning algorithm and a video combination positioning algorithm, so as to make a precise location for the cracks inside the pipelines based on the images photographed and the pipeline positions located. At a same time, the pipeline detection method may be widely applied to a conventional survey of a plurality of liquid pipelines including an urban drainage pipeline and a tap water pipeline.

Specifically, in the step S10, the detection apparatus has a gyroscope, an acceleration sensor, and a camera device configured inside, and collecting the angular velocity of the detection device by the gyroscope; collecting the acceleration of the detection device by the acceleration sensor; and photographing the pipeline image by the camera device.

Additionally, the camera device comprises at least a camera and an infrared fill light, so as to make the camera device be able to photograph the pipeline images of the pipelines. Accordingly, that putting the pre-set detection apparatus in the pipeline to be detected is specifically fixing the gyroscope, the acceleration sensor, and the camera device in a detection apparatus which has a capsule/spherical shape, the detection apparatus is placed into the pipeline before patrolling and inspecting, and collecting the movement information of the detection apparatus and the pipeline image of the pipeline once in every pre-set time. In an actual application, it is able to locate the pipeline based on a collected data after finishing patrolling and inspecting, or every time when collecting a group of detection data, processing the detection data corresponding to the collection moment right away, to make a location at the collection moment.

Additionally, the pre-set time may be set in advance, such as 1 second. Making a collection in every pre-set time, means getting a plurality of collection moments, and a time when the detection device is put in the pipeline to be detected is recorded as an initial collection moment. The collection moments formed by collecting once in every pre-set time are recorded respectively as an initial collection moment, a first collection moment, a second collection moment, an N-th collection moment. However, in a real practice, an interval between the collection moments of N may be different, that is, the collection moments of N may be pre-set, the detection apparatus reads a movement thereof and a pipeline image photographed at each detection time, thus it is possible to arrange different collection moments according to a specific condition of the pipeline, so as to further improve a precision for the pipeline location.

Further, the step S20, wherein the gyroscope and the acceleration sensor configured in the detection apparatus are detecting the angular velocity and the acceleration of the detection apparatus in a real time, here means reading the angular velocity and the acceleration detected by the gyroscope and the acceleration sensor at each collection moment, and use the inertial navigation algorithm to calculate the first position corresponding to each collection.

Specifically, in the step S20, calculating the first position where the detection apparatus is located at each of the collection moments, according to the movement information collected at each of the collection moments, comprising specifically:

S201, at the first collection moment, acquiring an initial position information of the detection device, wherein the initial position information comprises an initial velocity, an initial displacement, and an initial angle;

S202, calculating a position information at the first collection moment, according to a first movement information and the initial position information collected at the first collection moment;

S203, taking the position information at the first collection moment as an initial position at the second collection moment, and repeating the steps from S21 to S23 until all collection moments are finished calculating, so as to obtain the first position where the detection device is located at each of the collection moments.

Specifically, at the first collection moment, a time when the detection apparatus is put in the pipeline to be detected is taken as the initial collection moment, that is, a position information when the detection apparatus is put in the pipeline to be detected is taken as the initial position information, wherein, when the detection apparatus is initially placed, an initial velocity $V_0$ thereof is 0, an initial displacement $S_0$ is 0, the angular velocity is detected by the gyroscope, and an initial angle $\theta_0$, thus based on a classic Newton's law of motion and an acceleration integration principle, when the initial velocity $V_0$, the initial displacement $S_0$ and the initial angle $\theta_0$ of a target are known, as well as an acceleration a corresponding to the first collection moment and an interval t between the first collection moment and the initial moment, it is able to obtain a first velocity $V_1$ at the first collection moment by integrating the acceleration once, obtain a first displacement $S_1$ at the first collection moment by integrating the first velocity once, obtain a first angle $\theta_1$ by integrating a first angular velocity signal w measured by the gyroscope over a movement time once. Accordingly, a calculation formula of the first velocity $V_1$, the first displacement $S_1$, and the first angle $\theta_1$ may be:

$$\begin{cases} V_1 = \int_t a + V_0 \\ S_1 = \int_t V_1 + S_0 = \int \left( \int_t a + V_0 \right) + S_0 , \\ \theta_1 = \int_t w + \theta_0 \end{cases}$$

wherein, t represents an interval between the first collection moment and the initial collection moment.

Further, after determining the first displacement $S_1$ and the first angle $\theta_1$, a coordinate of the detection apparatus is calculated based on an active positioning algorithm. The active positioning algorithm is specifically collecting and calculating a displacement and an angle of a self-movement of a moving object, so as to decide a position of the moving object. In the present embodiment, suppose an initial coordinate of the detection apparatus at the initial moment is ($x_0$, $y_0$), calculating before obtaining the first displacement $S_1$ and the first angle $\theta_1$ of the detection apparatus at the first collection moment, by adopting a calculation formula below, it is able to calculate a coordinate of the detection apparatus at the first collection moment to be ($x_1$, $y_1$), wherein the calculation formula may be represented as:

$$\begin{cases} x_1 = x_0 + S_1 * \cos \theta_1 \\ y_1 = y_0 + S_1 * \cos \theta_1 \end{cases}.$$

For the second collection moment, it is able to take the first collection moment as the initial collection moment thereof, and the process described above is repeated until a corresponding coordinate ($x_2$, $y_2$) of the first position is obtained, and by repeating a plurality of operations described above sequentially, it is able to calculate and obtain the coordinates of the first positions corresponding to each collection moment, and for an N-th collection moment, the coordinate ($x_n$, $y_n$) corresponding to the first position may be represented as:

$$\begin{cases} x_n = x_{n-1} + S_n * \cos \theta_n \\ y_n = y_{n-1} + S_n * \cos \theta_n \end{cases}.$$

Further, the step S30, wherein the pipeline image is a pipeline image of the pipeline to be detected photographed by the camera device mounted on the detection apparatus. The pipeline image can, on one hand, be used for calculating a position of the detection device, and on another hand, the pipeline image can also be used for a crack detection in the pipelines. First, the second position where the detection device is locating refers to the second position where the detection device is locating in the pipelines to be detected, which can be calculated by calculating an image repetitiveness, that means, the displacement of the detection device in the pipelines to be detected during an interval time is calculated by a repetitiveness of the pipeline images and the interval time between adjacent collection moments, as well as accumulating the displacements before each collection moment to obtain the second position corresponding to each collection moment.

Specifically, the step S30, calculating a second position where the detection apparatus is located at each of the collection moments, according to a pipeline image photographed at each of the collection moments, comprising specifically:

S301, for the first collection moment, obtaining an initial pipeline image photographed when the detection device is launched;

S302, calculating a repetitiveness between a first pipeline image collected at the first collection moment and the initial pipeline image, before determining a second position at the first collection moment according to the repetitiveness;

S303, taking the first pipeline image collected at the first collection moment as an initial pipeline image at the second collection moment, and repeating the steps from S301 to S303 until a plurality of calculations on all collection moments are finished, to obtain the second position where the detection device is located at each of the collection moments.

Specifically, for the first collection moment, the pipeline image photographed when the detection apparatus is launched is taken as the initial pipeline image, and the first pipeline image photographed at the first collection moment is read. First, based on SIFT (Scale-invariant feature transform), a plurality of overlapping image feature points between the initial pipeline image and the first pipeline image are extracted, (wherein extracting the overlapping image feature points between two pipeline images based on SIFT belongs to the current technology in an image processing field, thus no more details are stated herein); secondly, adopting a RANSAC (Random Sample Consensus) algorithm to filter the overlapping image feature points extracted before obtaining a plurality of overlapping feature points (wherein extracting the overlapping image feature points between two pipeline images based on SIFT belongs to the current technology in an image processing field, thus no more details are stated herein); finally, based on the overlapping feature points filtered, calculating an affine transformation matrix between the initial pipeline image and the first pipeline image, and transforming an image center point in the initial pipeline image through the affine transformation matrix, to obtain a displacement of an image center point in the first pipeline image from the image center point in the initial pipeline image. In the present embodiment, a calculation process of the affine transformation matrix and the displacement is not described in details herein, instead, only an actual example is given for a description. For example, the affine transformation matrix is:

$$\begin{bmatrix} 0.934448659389011 & 0.0498577540928516 & 0 \\ -0.00112911153023674 & 0.917963049581227 & 0 \\ 12.4245640312067 & 22.5654123256108 & 1 \end{bmatrix}.$$

After transforming the image center point in the initial pipeline image by the affine transformation matrix, a horizontal displacement Δx of the image center point in the initial pipeline image is 16.8 pixels, and a vertical displacement Δy is 3.5 pixels. Thus a relative displacement pixel Δs between the overlapping image is 17.2 pixels.

Further, after obtaining a displacement $\Delta s_1$ at the first collection moment, it is also possible to recalibrate the displacement to obtain the first displacement $S_1$ by adopting a formula below:

$$S_1 = f \times \Delta s_1,$$

wherein, $f$ is a correction coefficient, $\Delta S_k$ represents a displacement at the K-th collection moment.

The correction coefficient is obtained by a calculation according to a total length L of the pipeline to be detected and a frequency N of the collection moments. In addition, the N-th collection moment will send N−1 times of displacements only, accordingly, a calculation formula of the correction coefficient $f$ may be:

$$f = \frac{L}{\sum_{k=1}^{N-1} \Delta s_k}.$$

For the second collection moment, it is possible to take the first collection moment as the initial collection moment, that is, taking the first pipeline image as the initial pipeline image, repeating the steps described above before obtaining a second displacement S2 at the second collection moment, wherein a calculation formula for the second displacement S2 may be:

$$S_2 = S_1 + f \times \Delta s_2 = f \times \sum_{k=1}^{2} \Delta s_k.$$

Repeating sequentially, an n-th displacement $S_n$ of the image center at the n-th collection moment may be represented as:

$$S_n = f \times \sum_{k=1}^{n} \Delta s_k.$$

Additionally, since adopting an image overlapping algorithm will get a displacement at each collection moment, thus after obtaining the displacement at each collection moment, the second positon of the detection apparatus in the pipeline to be detected at each collection moment will be calculated, according to the position of the image center point of the initial pipeline image, and an actual distribution diagram of the pipeline.

Further, in the step S40, after obtaining the first position and the second position at each collection moment, it is possible to fuse the first position and the second position to obtain a final position that the detection apparatus locates at each moment. Additionally, fusing the first position and the second position is executed sequentially according to a sequence of the collection moments, also, a calculation of the first position and the second position according to each collection moment is performed after a final position at a previous collection moment before the collection moment is calculated. That is, for each collection moment, it may first calculate the first position at the collection moment, then calculate the second position at the collection moment, before finally calculating the final positon based on the first position and the second position; or, it may first calculate the second position at the collection moment, then calculate the first position at the collection moment, before finally calculating the final positon based on the first position and the second position. While for all the collection moments, it is calculated according to a time sequence of the collection moments, calculating the first position, the second positon and the final position at a current collection moment first, then calculating the first position, the second positon and the final position at a next collection moment, until the calculations at all the collection moments are finished. In such a way, adopting a final position as an initial position at the next collection moment, may improve a precision for a position calculation.

Specifically, the step S40, determining the position where the detection apparatus is located at each of the collection moments, according to the first position and the second position at each of the collection moments, so as to locate the pipeline according to the position at each of the collection moments, comprises specifically:

S401, for each of the collection moments, determining whether the first position and the second position correspondingly are empty or not; If neither the first position nor the second position is empty, then executing a step S402, if the first position/the second positon is empty, then executing a step S404.

Specifically, the first position is empty, that means at the collection moment, either the angular velocity or the acceleration of the detection apparatus does not get read, thus there is no way to decide the first position according to the collection moment. That the second position is empty means there is no overlapping image feather point or less overlapping image feather points between the pipeline images collected at the collection moment and the pipeline images collected at the previous collection moment, which makes it impossible to calculate the affine transformation matrix between two of them, thus there is no way to determine the displacement at the current collection moment relative to the previous collection moment, thus no way to determine the second position according to the current collection moment.

S402, calculating a standard deviation of the first position and that of the second position respectively based on a third position pre-set according to the collection moment;

Specifically, the third position is the position where the detection apparatus locates in the pipeline to be detected at the collection moment, which is obtained in advance through a simulation experiment, and a standard deviation of the first position and the second position according to the third position is calculated respectively S403, taking the standard deviation as a weighting coefficient to weight the first position and the second position, to obtain a determination of the position according to the collection moment, so as to locate the pipeline according to the position at each of the collection moments.

S404, taking the second position/the first position as the position corresponding to the collection moment, so as to locate the pipeline based on the position at each collection moment.

In an embodiment of the present disclosure, the pipeline detection method, wherein may further comprise:

S50, detecting all of the pipeline images photographed, and obtaining the collection moments corresponding to the pipeline images having at least one crack.

Specifically, that detecting all of the pipeline images photographed refers to detecting each of the pipeline images photographed sequentially. While in an actual application, since when obtaining the pipeline images, a camera device has a high requirement for lighting, and an unevenness of a light may cause a plurality of banded strips in an image generated, while containing excessive longitudinal noises may make a detection result meaningless, thus before detecting the cracks carried in the pipeline image, it is necessary to perform an image grayscale correction. A process of the image grayscale correction may:

first, for a pipeline image I(p) containing cracks, it is mainly composed by a pipeline background signal $I_b(p)$, a pipeline crack signal $I_c(p)$, a random noise signal $I_n(p)$ and a noise signal $I_a(p)$ caused by an uneven light, accordingly, the pipeline image I(p) may be expressed as:

$$I(p)=I_b(p)+I_c(p)+I_n(p)+I_a(p).$$

Secondly, obtaining a line in a difference image by acquiring a difference between each pixel in a line in the image and a mean value of the line in the image, then performing a least squares fit on the line in the difference image by a sine function, and obtaining a sine parameter in an $I_a(p)$ component, before calculating an $I_a(p)$ gray difference for each pixel, which is used as a gray compensation for the pixel to eliminate the $I_a(p)$ component. An image after the grayscale correction is:

$$I(p)=I(p)-I_a(p)=I_b(p)+I_c(p)+I_n(p).$$

Further, after performing the grayscale correction on the image, performing a crack damage detection on the image after correction. In the present embodiment, a multi-scale strategy crack damage detection model is applied to performing the crack detection on the pipeline image after correction. A process of the detection may first divide the image into three levels, namely a pixel-level image, a unit-level image, and a block-level image, then segment the image through two calculation processes to perform the crack detection. Specifically, the process of the detection is specifically:

first, making a plurality of calculations on grayscales based on the pixel-level image to the unit-level image, and by the calculation, it is able to eliminate an effect of the random noise, while lowering a time calculation dimension. For example, selecting a window having 4*4 pixels as a unit to calculate a unit grayscale value:

$$\text{Gray}_{unit}=\lambda \text{Min}_{unit}+(1-\lambda)\text{Mean}_{unit},$$

wherein the $\text{Gray}_{unit}$ is a unit grayscale value calculated, $\text{Min}_{unit}$ is a minimum of the unit grayscale value, $\text{Mean}_{unit}$ is a mean value of the unit grayscale value, λ A is a weight of the minimum of the unit grayscale value.

An expression of the λ may be:

$$\lambda = f(\text{Mean}_{unit}, \text{Mean}_{whole}, \text{Dev}_{unit}, \text{Dev}_{whole}) = \frac{\frac{\text{Dev}_{unit}}{\text{Dev}_{whole}}}{\frac{\text{Dev}_{unit}}{\text{Dev}_{whole}} + \frac{\text{Mean}_{unit}}{\text{Mean}_{whole}}},$$

wherein, $\text{Mean}_{whole}$ is a mean value of the image in a whole, $\text{Dev}_{unit}$ is a standard deviation of the unit, $\text{Dev}_{whole}$ is a standard deviation of the image in a whole. Also, if a mean value of the unit is larger, the λ is smaller, thus the unit grayscale value is closer to the mean value of the image, that means a probability of the unit containing a crack gets smaller, otherwise getting bigger.

Secondly, executing a difference histogram segmentation to an image block based on the unit level, and calculating a statistical value $Dh_g$ of a pixel variation of a certain grayscale level g on eight neighborhoods (eight pixels surrounding), a calculation formula thereof may be:

$$Dh_g = \sum_i^{i=n-1}\sum_j^{j=m-1} \frac{1}{8}\sum_{h=-1}^{h=1}\sum_{k=-1}^{k=1}(\text{Gray}_{((i+h)*m+(j+k))} - g) \; g \in [0, 255],$$

wherein, Gray is a grayscale value, n, m is a line number and a row number of the image. Thus, a grayscale segmentation threshold $T_{Dh}$ is determined, expressed as:

$$T_{Dh}=g(\text{Max}_{g=0}^{g=255}(Dh_g))g\in[0,255]$$

Based on the threshold, the images in grayscale are transformed into a plurality of binary images:

$$Gc(i, j) = \begin{cases} 255 & \text{Gray}_{(i,j)} \leq T_{Dh} \quad i \in [0, n-1] \\ 0 & \text{Gray}_{(i,j)} > T_{Dh} \quad j \in [0, m-1] \end{cases},$$

wherein, m, n represents a unit number of the block-level image at a horizontal direction and a vertical direction respectively.

Finally, by performing an edge tracking on an area having a crack detected, an edge vector of the crack will be obtained, followed by extracting a plurality of geometric features of the crack (including a plurality of point features, a plurality of line features, and a plurality of surface features), and determining a type of the crack according to the geometric features.

S60, obtaining a position corresponding to the collection moment, so as to locate the crack.

Specifically, obtaining the collection moment of the pipeline image containing the crack, then determining the position where the crack locates based on a plurality of positions corresponding to each of the collection moments calculated, so as to locate the crack.

The present disclosure further provides a computer readable storage medium, the computer readable storage medium has one or more programs stored, the one or more programs is able to be executed by one or more processors, so as to realize the steps in any one of the pipeline detection methods described above.

Figure 2:
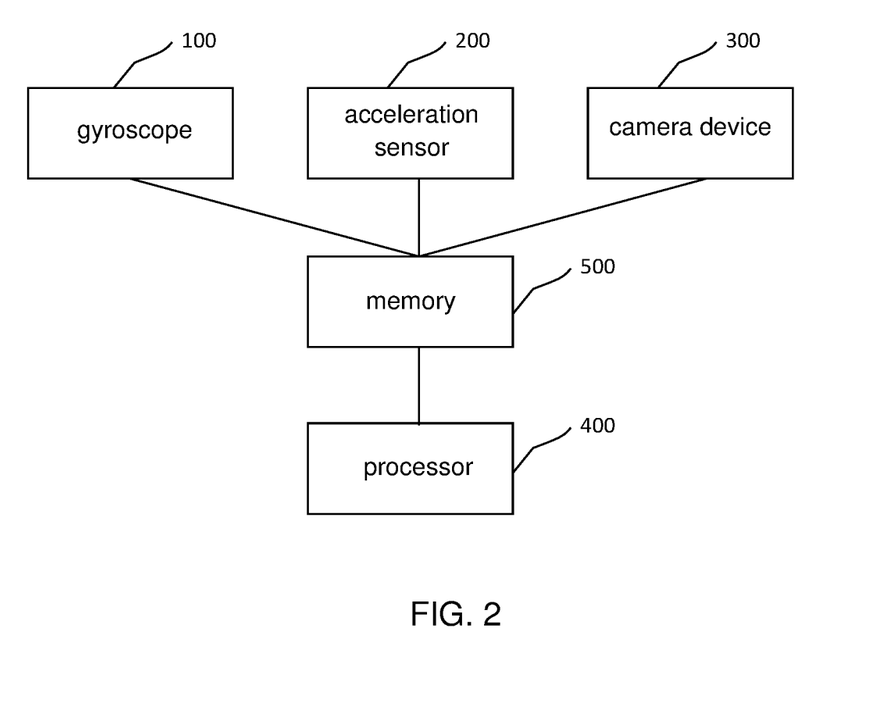
FIG. 2 illustrates a structural schematic diagram for an embodiment of the pipeline detection apparatus provided by the present disclosure.

The present disclosure further provides a detection apparatus, shown as FIG. 2, a detection apparatus, has a gyroscope 100, an acceleration sensor 200, a camera device 300, a processor 400 and a memory 500 arranged therein; the gyroscope 100, the acceleration sensor 200, the camera device 300 are all connecting to the memory 500;

the memory 500 has a plurality of computer readable programs stored, the computer readable programs are able to be executed by the processor 400; together with a plurality of data collected by the gyroscope 100, the acceleration sensor 200, and the camera device 300 at each of the collection moments;

when the processor 400 executes the computer readable programs, it is able to realize the steps in any one of the pipeline detection methods described above.

The present disclosure further provides a pipeline detection system, wherein comprising a detection apparatus and a terminal, the detection apparatus has a gyroscope, an acceleration sensor, and a camera device configured, the terminal comprises a processor and a memory; the detection apparatus is applied to being placed into a pipeline to be detected, collecting a pipeline image of the pipeline to be detected and a movement information thereof, the terminal is applied to receiving the pipeline image and the movement information collected by the detection apparatus, and calculating the positions where the detection apparatus is located in the pipeline to be detected at each collection moment, according to the pipeline images and the movement information.

Further, the memory has a computer readable program stored, the computer readable program is able to be executed by the processor; together with a plurality of data collected by the gyroscope, the acceleration sensor, and the camera device at each of the collection moments; when the processor executes the computer readable program, it is able to realize the steps in any one of the pipeline detection methods described above.

Additionally, a specific process of how a plurality of commands in the storage medium, the detection apparatus and the terminal are loaded and executed by the processors has been described in details the methods above, thus no more details will be described herein.

Finally, it should be noted that, the application of the present disclosure is not limited to the above examples listed. Ordinary technical personnel in this field can improve or change the applications according to the above descriptions, all of these improvements and transforms should belong to the scope of protection in the appended claims of the present disclosure.

What is claimed is:

1. A pipeline detection method, comprising:
S1, putting a pre-set detection apparatus in a pipeline to be detected, collecting movement information thereof and photographing a pipeline image by the detection apparatus at one or more pre-set times, wherein the movement information comprises an angular velocity and an acceleration;
S2, calculating a first position where the detection apparatus is located at each collection moment, according to the movement information collected at each collection moment;
S3, calculating a second position where the detection apparatus is located at each of the collection moment, according to the pipeline image photographed at each collection moment; and
S4, determining a position where the detection apparatus is located at each collection moment, according to the first position and the second position at each collection moment, so as to locate the pipeline according to the position at each collection moment;
wherein calculating a second position where the detection apparatus is located at each of the collection moments, according to the pipeline image photographed at each of the collection moments, comprises:
S31, for the first collection moment, obtaining an initial pipeline image photographed when the detection device is launched;
S32, calculating a repetitiveness between a first pipeline image collected at the first collection moment and the initial pipeline image, before determining the second position at the first collection moment according to the repetitiveness; and
S33, taking the first pipeline image collected at the first collection moment as an initial pipeline image at the second collection moment, and repeating steps S31 to S33 until a plurality of calculations at all collection moments are finished, to obtain the second position where the detection device is located at each of the collection moments.

2. The pipeline detection method according to claim 1, wherein the detection apparatus has a gyroscope, an acceleration sensor, and a camera device configured inside the detection apparatus.

3. The pipeline detection method according to claim 2, wherein collecting the movement information thereof and photographing the pipeline image by the detection apparatus at one or more pre-set times, comprises:
collecting an angular velocity of the detection device in every pre-set time by the gyroscope; collecting an acceleration of the detection device in every pre-set time by the acceleration sensor; and photographing the pipeline image in every pre-set time by the camera device.

4. The pipeline detection method according to claim 1, wherein calculating the first position where the detection apparatus is located at each collection moment, according to the movement information collected at each collection moment, comprises:
S21, at a first collection moment, acquiring an initial position information of the detection device, in which the initial position information comprises an initial velocity, an initial displacement, and an initial angle;
S22, calculating position information at the first collection moment, according to a first movement information and the initial position information collected at the first collection moment; and
S23, taking the position information at the first collection moment as an initial position at a second collection moment, and repeating steps S21 to S23 until finishing calculating all collection moments, so as to obtain a first position where the detection device is located at each of the collection moments.

5. The pipeline detection method according to claim 1, wherein determining the position where the detection apparatus is located at each of the collection moments, according to the first position and the second position at each of the collection moments, so as to locate the pipeline according to the position at each of the collection moments, comprises:
S41, for each of the collection moments, determining whether the first position and the second position correspondingly are empty or not;
S42, if neither the first position nor the second position is empty, calculating a standard deviation of the first position and that of the second position respectively based on a third position pre-set according to the collection moment; and
S43, adopting the standard deviation as a weighting coefficient to weight the first position and the second position, to obtain a determination of the position according to the collection moment, so as to locate the pipeline according to the position at each of the collection moments.

6. The pipeline detection method according to claim 5, wherein determining the position where the detection apparatus is located at each of the collection moments, according to the first position and the second position at each of the collection moments, so as to locate the pipeline according to the position at each of the collection moments, further comprises:
S44, if the first position or the second position is empty, taking the second position or the first position as the position corresponding to the collection moment, so as to locate the pipeline according to the position at each collection moment.

7. The pipeline detection method according to claim 1, wherein after the detection apparatus is located at each of the collection moments, according to the first position and the second position at each of the collection moments, so as to locate the pipeline according to the position at each of the collection moments, the method further comprises:
S5, detecting all of the pipeline images photographed, and obtaining collection moments corresponding to the pipeline images having at least one crack; and
S6, obtaining the positions corresponding to the collection moment, so as to locate the crack.

8. A non-transitory computer readable storage medium, wherein the computer readable storage medium has one or more programs stored, the one or more programs is able to be executed by one or more processors, so as to realize a pipeline detection method, comprising:
S1, putting a pre-set detection apparatus in a pipeline to be detected, collecting movement information thereof and photographing a pipeline image by the detection apparatus at one or more pre-set times, wherein the movement information comprises an angular velocity and an acceleration;
S2, calculating a first position where the detection apparatus is located at each collection moment, according to the movement information collected at each collection moment;
S3, calculating a second position where the detection apparatus is located at each of the collection moment, according to the pipeline image photographed at each collection moment; and
S4, determining a position where the detection apparatus is located at each collection moment, according to the first position and the second position at each collection moment, so as to locate the pipeline according to the position at each collection moment;
wherein calculating a second position where the detection apparatus is located at each of the collection moments, according to the pipeline image photographed at each of the collection moments, comprises:
S31, for the first collection moment, obtaining an initial pipeline image photographed when the detection device is launched;
S32, calculating a repetitiveness between a first pipeline image collected at the first collection moment and the initial pipeline image, before determining the second position at the first collection moment according to the repetitiveness; and
S33, taking the first pipeline image collected at the first collection moment as an initial pipeline image at the second collection moment, and repeating steps S31 to S33 until a plurality of calculations at all collection moments are finished, to obtain the second position where the detection device is located at each of the collection moments.

9. A detection apparatus, wherein having a gyroscope, an acceleration sensor, a camera device, a processor and a memory therein; the gyroscope, the acceleration sensor, the camera device are all connecting to the memory;
the memory has a computer readable program stored, the computer readable program is able to be executed by the processor; together with a plurality of data collected by the gyroscope, the acceleration sensor, and the camera device at each of the collection moments;
when the processor executes the computer readable program, it is able to realize a pipeline detection method, comprising:
S1, putting a pre-set detection apparatus in a pipeline to be detected, collecting movement information thereof and photographing a pipeline image by the detection apparatus at one or more pre-set times, wherein the movement information comprises an angular velocity and an acceleration;
S2, calculating a first position where the detection apparatus is located at each collection moment, according to the movement information collected at each collection moment;
S3, calculating a second position where the detection apparatus is located at each of the collection moment, according to the pipeline image photographed at each collection moment; and
S4, determining a position where the detection apparatus is located at each collection moment, according to the first position and the second position at each collection moment, so as to locate the pipeline according to the position at each collection moment;
wherein calculating a second position where the detection apparatus is located at each of the collection moments, according to the pipeline image photographed at each of the collection moments, comprises:
S31, for the first collection moment, obtaining an initial pipeline image photographed when the detection device is launched;
S32, calculating a repetitiveness between a first pipeline image collected at the first collection moment and the initial pipeline image, before determining the second position at the first collection moment according to the repetitiveness; and
S33, taking the first pipeline image collected at the first collection moment as an initial pipeline image at the second collection moment, and repeating steps S31 to S33 until a plurality of calculations at all collection moments are finished, to obtain the second position where the detection device is located at each of the collection moments.

* * * * *